(12) United States Patent
Bresselschmidt et al.

(10) Patent No.: US 9,993,066 B2
(45) Date of Patent: *Jun. 12, 2018

(54) METHOD TO MANUFACTURE AN INJECTION MOLDED COMPONENT AND INJECTION MOLDED COMPONENT

(71) Applicant: The Gillette Company LLC, Boston, MA (US)

(72) Inventors: Andreas Bresselschmidt, Eschborn (DE); Jochen Ganninger, Frankfurt (DE); Benedikt Heil, Frankfurt am Main (DE); Uwe Jungnickel, Koenigstein/Taunus (DE); Joerg Kotitschke, Waldems (DE); Andreas Reuschenbach, Bad Soden (DE); Holger Schulz, Frankfurt am Main (DE)

(73) Assignee: THE GILLETTE COMPANY LLC, Boston, MA (US)

( * ) Notice: Subject to any disclaimer, the term of this patent is extended or adjusted under 35 U.S.C. 154(b) by 507 days.

This patent is subject to a terminal disclaimer.

(21) Appl. No.: 14/572,083

(22) Filed: Dec. 16, 2014

(65) Prior Publication Data
US 2015/0230598 A1 Aug. 20, 2015

(30) Foreign Application Priority Data
Dec. 19, 2013 (EP) .................................... 13198453

(51) Int. Cl.
*B29C 45/16* (2006.01)
*A46D 99/00* (2006.01)
(Continued)

(52) U.S. Cl.
CPC ............... *A46D 99/00* (2013.01); *A46B 5/02* (2013.01); *B29C 2045/0056* (2013.01); *B29C 2045/1673* (2013.01); *Y10T 428/24273* (2015.01)

(58) Field of Classification Search
CPC ............... B29C 2045/0056; B29C 2045/1673
(Continued)

(56) References Cited

U.S. PATENT DOCUMENTS 2,875,472 A * 3/1959 Marcus
5,028,377 A 7/1991 Watson
(Continued)

FOREIGN PATENT DOCUMENTS

DE 19500138 7/1996
DE 10341141 3/2005
(Continued)

OTHER PUBLICATIONS

Extended European Search Report for CM3980Q dated Mar. 17, 2014.

*Primary Examiner* — Jill L Heitbrink

(57) ABSTRACT

A method for manufacturing an injection-molded first component of an article, in particular a handle or a head of a toothbrush, having a sheath element with a cavity and a recess extending from the cavity into a wall of the sheath element surrounding the cavity, including the steps of: (1) providing a first mold having first mold components that define a first mold cavity in the form of a pre-sheath element having a through hole in the pre-sheath element at the location where the recess shall be formed, (2) injection-molding of the pre-sheath element using a first plastic material, (3) closing the through-hole with a lid element, (4) providing a second mold having second mold components for receiving the pre-sheath element and for defining a remaining second mold cavity that extends at least over a (Continued)

part of a parting line between the lid element and the pre-sheath element when the pre-sheath element is inserted in the second mold, (5) inserting the pre-sheath element into the second mold, and (6) connecting the lid element with the pre-sheath element by injecting a second plastic material into the remaining second mold cavity such that the sheath element is formed.

13 Claims, 5 Drawing Sheets

(51) Int. Cl.
*A46B 5/02* (2006.01)
*B29C 45/00* (2006.01)

(58) Field of Classification Search
USPC .................................................. 264/238
See application file for complete search history.

(56) References Cited

U.S. PATENT DOCUMENTS

| | | | |
|---|---|---|---|
| 5,355,544 A | 10/1994 | Dirksing | |
| 5,498,456 A * | 3/1996 | Ikebe | G11B 23/0332 |
| | | | 360/133 |
| 6,645,587 B1 | 11/2003 | Guergov | |
| 2006/0092601 A1 | 5/2006 | Centofante et al. | |
| 2007/0222109 A1* | 9/2007 | Pfenniger | A46B 5/0062 |
| | | | 264/241 |
| 2012/0291885 A1 | 11/2012 | Altonen et al. | |
| 2012/0292823 A1 | 11/2012 | Altonen et al. | |
| 2012/0294963 A1 | 11/2012 | Altonen et al. | |
| 2012/0295049 A1 | 11/2012 | Altonen et al. | |
| 2012/0295050 A1 | 11/2012 | Altonen et al. | |
| 2013/0069280 A1 | 3/2013 | Altonen et al. | |
| 2013/0113131 A1 | 5/2013 | Altonen et al. | |
| 2013/0221572 A1 | 8/2013 | Berg et al. | |
| 2013/0221575 A1 | 8/2013 | Altonen et al. | |
| 2015/0174802 A1* | 6/2015 | Newman | A46B 9/04 |
| | | | 15/22.1 |

FOREIGN PATENT DOCUMENTS

| | | | |
|---|---|---|---|
| DE | 102006059250 | | 6/2008 |
| JP | H0329309 | | 3/1991 |
| JP | H06270182 | | 9/1994 |
| JP | H0857887 | | 3/1996 |
| JP | H08267504 | | 10/1996 |
| JP | 2003189936 | | 7/2003 |
| WO | WO200182825 | | 11/2001 |
| WO | 2012/105964 | * | 8/2012 |

* cited by examiner

METHOD TO MANUFACTURE AN INJECTION MOLDED COMPONENT AND INJECTION MOLDED COMPONENT

FIELD OF THE INVENTION

The present invention is concerned with a method to manufacture an injection molded first component of an article and also with an injection molded first component of an article. It is in particular concerned with such a component having a cavity and a recess extending from the cavity into a wall of a sheath element that is at least partly surrounding the cavity.

BACKGROUND OF THE INVENTION

It is known that in order to form recesses or undercuts in injection molded components that cannot be deformed using a standard mold tool having two mold parts and a core, a retractable pin can be used that is retracted into a mold part or the core prior to demolding the injection molded component. Such a retractable pin increases the costs of making such a mold tool and this technology may reach its limits due to, e.g., the small size of a core not easily allowing incorporating a retractable pin or slider element.

It is an object of the present disclosure to provide a method to manufacture an injection molded first component of an article having such a recess and such injection molded first component of an article that are improved over the prior art or that at least provide an alternative with respect to the available prior art.

SUMMARY OF THE INVENTION

In accordance with a first aspect there is provided a method to manufacture an injection molded first component of an article, in particular a handle or a head of a toothbrush, having a sheath element with a cavity and a recess extending from the cavity into a wall of the sheath element surrounding the cavity comprising the steps of: (1) providing a first mold having first mold components that define a first mold cavity in the form of a pre-sheath element having a through hole in the pre-sheath element at the location where the recess shall be formed, (2) injection molding of the pre-sheath element using a first plastic material, (3) closing the through-hole with a lid element, (4) providing a second mold having second mold components for receiving the pre-sheath element and for defining a remaining second mold cavity that extends at least over a part of a parting line between the lid element and the pre-sheath element when the pre-sheath element is inserted in the second mold, (5) inserting the pre-sheath element into the second mold, and (6) connecting the lid element with the pre-sheath element by injecting a second plastic material into the remaining second mold cavity such that the sheath element is formed.

In accordance with a second aspect there is provided a method to manufacture an article, in particular a toothbrush, comprising the steps of: (1) providing a first component in accordance with the first aspect, (2) providing a second component having a protrusion suitable for insertion into the cavity of the first component, where the protrusion has a flexible snap element having a snap protrusion suitable for snapping into the recess, and (3) connecting the first component and the second component such that the protrusion is inserted into the cavity and the snap protrusion of the flexible snap element snaps into the recess.

In accordance with a third aspect there is provided an injection molded first component of an article, in particular a handle or a head of a toothbrush, comprising a sheath element having a cavity and a recess extending from the cavity into a wall of the sheath element surrounding the cavity, wherein the recess is formed by a through hole in a pre-sheath element and a lid element closing the through hole, which lid element is connected with the pre-sheath element by a plastic material injection molded over at least a part of a parting line between the lid element and the pre-sheath element.

In accordance with a fourth aspect there is provided an article, in particular a toothbrush, comprising: a first component in accordance with the above third aspect or made in accordance with the above first aspect, and a second component having a protrusion with a flexible snap element having a snap protrusion, where the protrusion is located in the cavity and the snap protrusion is located in the recess.

BRIEF DESCRIPTION OF THE DRAWINGS

The present disclosure will be further elucidated by a detailed description of the proposed methods and components/articles in more general terms and with reference to example embodiments explained by further reference to figures. In the figures

DETAILED DESCRIPTION OF THE INVENTION

Figure 1:
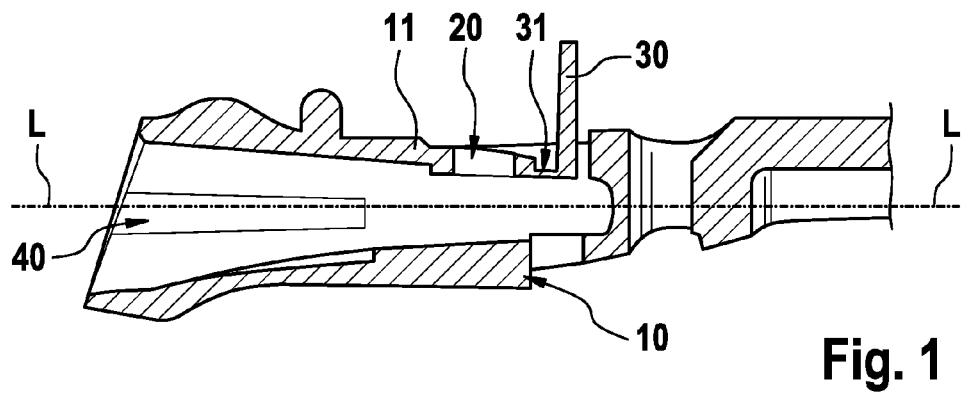
FIG. 1 is a longitudinal cross sectional cut through a portion of an example embodiment of a pre-sheath element resulting from a first injection molding step using a first mold.

While the following description explains the proposed method and the proposed article and first component of an article mainly by means of an example from the area of toothbrushes, this should not be considered as limiting and the general concept described herein can be applied with respect to all first components of articles where a recess is to be realized in an inner cavity of a sheath element of the first component, which sheath element with such a recess would not be easily demoldable from a mold without using a movable pin or slider element that can be retracted prior to removing the sheath element from the mold. Such articles may in particular be personal grooming devices such as wet shavers or oral hygiene devices such as toothbrushes, tongue cleaners, flossing devices etc.

A first component of an article in accordance with the present description is characterized by comprising a sheath element having a cavity that extends from one end of the sheath element into the sheath element and a recess that extends from the cavity into the wall of the sheath element surrounding the cavity. The first component further has a lid element that closes a through-hole arranged at the location where the recess is to be formed in the wall of a pre-sheath element surrounding the cavity so that the recess is formed by the closed through-hole. The lid element may in particular be a bent lid element that previously extended from the pre-sheath element and was made integrally together with the pre-sheath element in a plastic injection molding step. In some embodiments, the lid element is a separate element, i.e. an element that was not integrally injection molded together with the pre-sheath element. Generally, the lid element is connected with the sheath element by an injection molded material that extends over at least a part of a parting line between the lid element and the outer surface of the pre-sheath element, so that the sheath element is formed by the pre-sheath element, the lid element, and the overmolded material connecting the lid element with the pre-sheath element. A first component of an article as described can be made without the need of a movable slider element in a core element of the mold for injecting-molding of the pre-sheath element.

As will be explained with respect to an example embodiment with further reference to FIGS. 8 and 9, a first component of an article is formed by first forming a pre-sheath element having a cavity and a through hole arranged at a location at which a recess is to be formed in the (final) sheath element extending from the cavity to the outside of the pre-sheath element, which pre-sheath element is injection molded in a first mold tool that has first mold components (typically a first injector mold, a first ejector mold, and a first core element for defining the cavity in the first mold tool for injection molding the pre-sheath element. In a second injection molding step in accordance with the present disclosure, a lid element is used to close the through hole in the pre-sheath element, so that a recess remains from the through hole, which recess extends from the cavity into a wall of the (final) sheath element. The lid element is connected to the pre-sheath element by a further injection molding step that happens in a second mold having second mold components. In some embodiments, at least one second mold component is realized by a first mold component of the first mold. E.g. the first core element may be used to transfer the pre-sheath element from the first mold into the second mold.

FIG. 1 is a longitudinal cross-sectional cut through a portion of an example pre-sheath element 10 (partially shown) in accordance with the present description. The pre-sheath element 10 is made by an (plastic) injection molding step (as will be explained further below with reference to FIG. 8). The pre-sheath element 10 has a cavity 40 that extends from one end of the pre-sheath element 10 into the pre-sheath element 10 and a through-hole 20 that extends from the cavity 40 (i.e. from an inner side of a wall 11 of the pre-sheath element, which wall 11 is surrounding the cavity 40) to the outside of the pre-sheath element 10 (i.e. the through-hole 20 extends fully through the wall 11 of the pre-sheath element 10). A lid element 30 is here integrally realized together with the pre-sheath element 10, which lid element 30 extends essentially perpendicular from the pre-sheath element 10 with respect to a longitudinal direction L (as will be explained with respect to FIG. 8, the lid element 30 extends in such a way from the pre-sheath element 10 that it can easily be removed from a first mold when the first mold is opened). In some embodiments, the lid element 30 is connected to the pre-sheath element 10 by a living hinge 31 allowing bending the lid element 30 such that the risk of breaking the lid element 30 off from the pre-sheath element 10 is at least reduced. Suitable plastic materials for living hinges include polypropylene and polyethylene, but as in the context of the present disclosure, the lid element 30 does not need to be repeatedly bent, other materials such as PET (polyethylene terephthalate), ASA (acrylonitrile styrene acrylate), ABS (acrylonitril butadiene styrol), or co-polyesters thereof are as well suitable.

Figure 2:
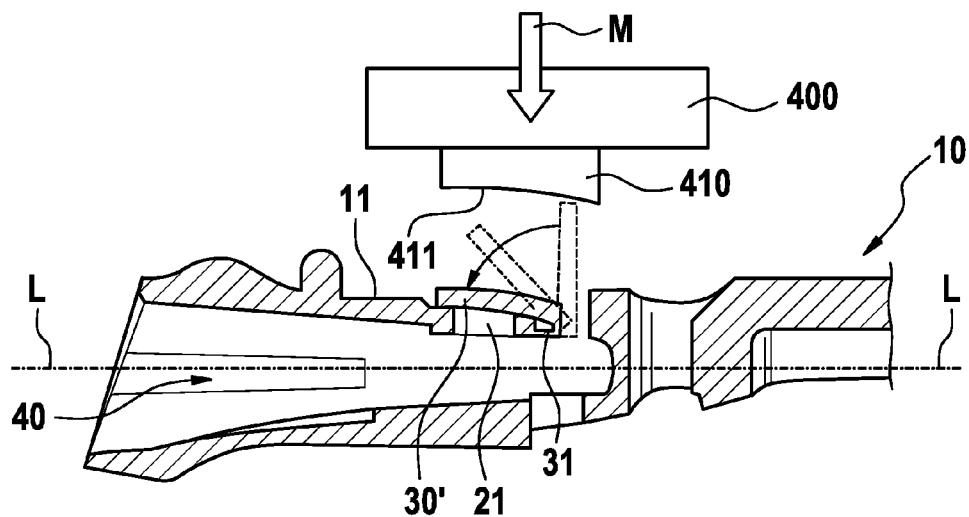
FIG. 2 is a longitudinal cross section similar to FIG. 1 in which one example way to close a through hole in a pre-sheath element by a lid element is schematically shown.

FIG. 2 shows the same longitudinal cross-sectional cut through the pre-sheath element 10 as in FIG. 1, but schematically shows the step of bending the lid structure 30 (shown with dotted lines) from its perpendicular position into a position, where the bent lid element 30' (shown with solid lines) closes the through hole such that a recess 21 remains that extends from the cavity 40 into the wall 11 of the pre-sheath element 10. In order to bend the lid element 30, a stamping tool 400 is used that is here essentially moved towards the pre-sheath element 10 along a movement direction M that is perpendicular to the longitudinal direction L (obviously, instead of moving the stamping tool 400, the pre-sheath element 10 may be moved towards the stamping tool 400 or both may be moved together towards each other). The stamping tool 400 here has a projection 410 that has a contact surface 411 that has a curvature that supports the bending action and determines a bending direction. When the stamping tool 400 is moved towards the pre-sheath element 10, the free end of the lid element 30 contacts the contact surface 411 of the projection 410 (the lid element 30 in its original position is indicated by a dotted line in FIG. 2). While the pre-sheath element 10 and the stamping tool 400 are moved towards each other, the free end of the lid element 30 glides along the curved contact surface 411 of the projection 410 and is thereby bent (an intermediate bent position of the lid element 30 is shown by a dash-dotted line in FIG. 2). The living hinge 31 supports this bending procedure and effectively avoids that the lid element 30 breaks off. In some embodiments, the lid element 30 comprises a ridge or groove that engages with a respective inversely arranged groove or ridge in the contact surface 411 to guide the lid element 30 during the bending process and to effectively avoid that the lid element 30 is bent sideways. Finally, the lid element 30 is bent into a position (shown with a solid line in FIG. 2) in which the bent lid element 30' closes the through-hole 20 (shown in FIG. 1) and a recess 21 remains that extends from the cavity 40 into the wall 11 of the pre-sheath element 10.

In some embodiments, the stamping tool 400 is realized as a part of a second mold component as will be explained with reference to FIG. 9.

Figure 3:
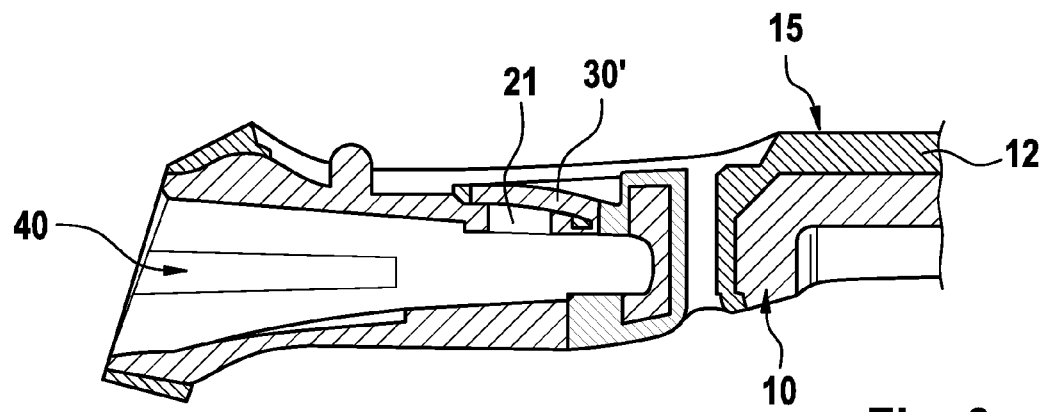
FIG. 3 is a longitudinal cross section through a portion of an example embodiment of a (final) sheath element in which the lid element shown in FIGS. 1 and 2 was connected with a pre-sheath element in order to seal the through hole and to thereby realize a recess extending from a cavity inside of the sheath element into the sheath element.
Figure 4:
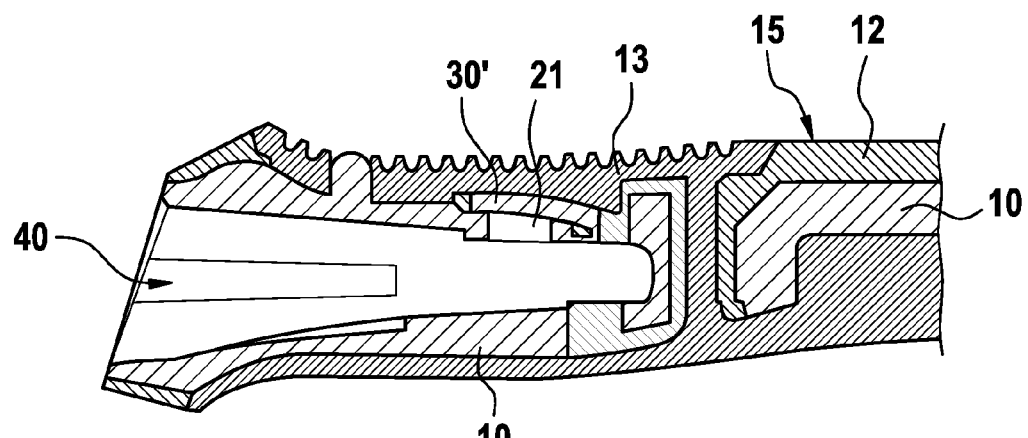
FIG. 4 is a longitudinal cross section through a portion of an example embodiment of a first component of an article in accordance with the present disclosure.

FIG. 3 shows a (final) sheath element 15 (partially shown) in which the bent lid element 30' is connected with the pre-sheath element 10 so as to seal the recess 21 and to keep the bent lid element 30' in its bent position by an additional injection molded material 12 that was injected at least over a part of the parting line between the bent lid element 30' and the outer side of the pre-sheath element 10. The additional injection molded material 12 may be chosen such that it establishes a chemical bond with the material of the pre-sheath element 10 and of the lid element 30 or the injection molded material may, e.g., extend into undercuts or may extend around the pre-sheath element 10 so that it keeps the bent lid element 30' in the bent position in which the recess is sealed by a form fit or a force fit. Due to the sealing of the recess 21 by the bent lid element 30', no additional injection molded material 11 is in the recess 21 (the bent lid element 30' effectively avoids that the additional material flows into the recess 21 in the respective injection molding step). As will be explained with reference to FIG. 9, the bent lid element 30' may be held in the bent position in a mold tool by a projection as shown in FIG. 2 while the additional material is injection molded. The additional injection molded material 12 may be the same material as used for making the pre-sheath element 10 or it may be another material. While the pre-sheath element 10 may be made from a hard plastic material, e.g. a plastic material having a Shore D hardness above 65, the additional material may either also be a hard plastic or an elastomeric plastic material (e.g. a rubber-like plastic or thermoplastic elastomer) having a Shore A hardness in the range of about 20 to about 90. In some embodiments, the additional injection molded material 12 just connects the bent lid element 30' with the pre-sheath element 10. Additionally, in some embodiments, the additional injection molded material 12 forms further parts of the first component of an article besides the connection seam between bent lid element 30' and pre-sheath element 10 (the pre-sheath element 10, the bent lid element 30', and the additional injection molded material 12 together form the (final) sheath element 15). In some embodiments, the (final) sheath element 15 forms the first component of an article in accordance with the present disclosure. In some embodiments, as will be discussed with reference to FIG. 4, at least one further material may be used to form additional parts of the first component of an article.

FIG. 4 shows again a longitudinal cross-sectional cut through a first component for an article that comprises a (final) sheath element 15 formed by a pre-sheath element 10, a lid element 30' and an additional injection molded material 12 as shown in FIG. 3, but a further injection molded material 13 forms further parts of the first component of an article. In some embodiments, one or even more further materials may be added to together with the (final) sheath element form the first component of an article in accordance with the present description. It is also contemplated that the first component of an article is further processed, e.g. by a polishing step or by an imprinting step.

Figure 5A:
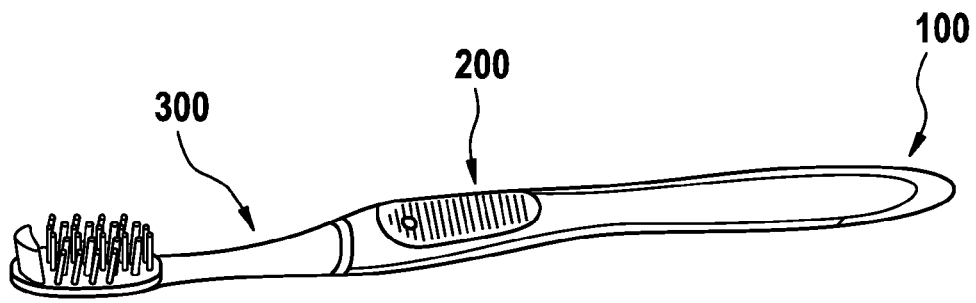
FIG. 5A is a depiction of an example embodiment of an article comprising a first component in accordance with the present disclosure and a second component connected with the first component.
Figure 5B:
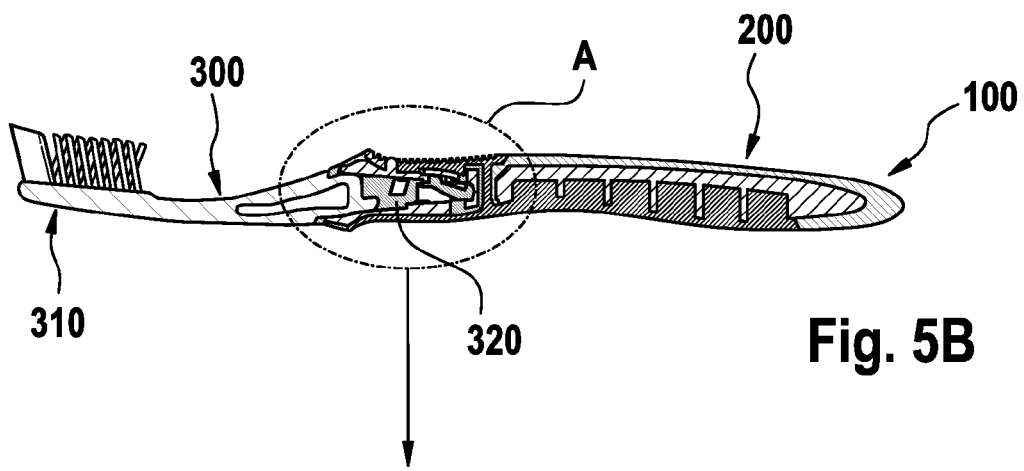
FIG. 5B is a longitudinal cross section through the article shown in FIG. 5A.
Figure 5C:
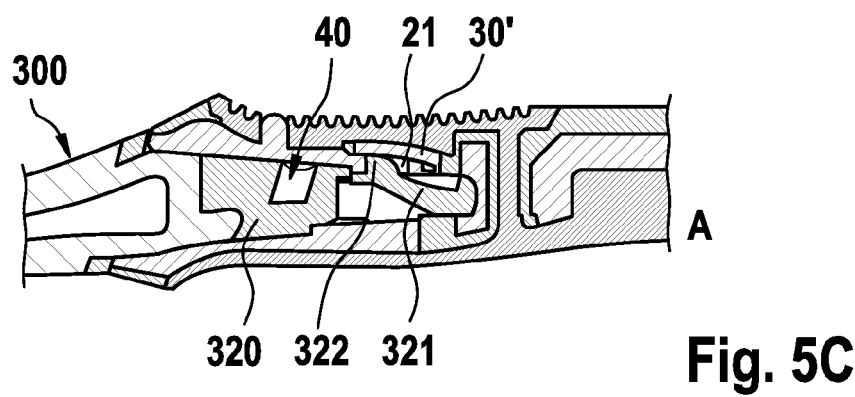
FIG. 5C is a magnification of a portion of the longitudinal cross sectional cut shown in FIG. 5B.

FIG. 5A is a perspective view onto an article 100, here realized as a manual toothbrush, comprising a first component 200 and a second component 300. FIG. 5B is a longitudinal cross-sectional cut through the article 100 and FIG. 5C shows a magnification of a central area A of the cross-sectional cut of FIG. 5B. In the shown example embodiment, the first component 200 forms a handle of the article 100 and the second component 300 forms a head, here a toothbrush head, of the article 100. As can be seen in FIGS. 5B and 5C, the article 100 is formed by snapping together the first component 200 and the second component 300. In order to accomplish that the first and second components can be snapped together, the second component 300 comprises a protrusion 320 shaped such that it fits into the cavity 40 (e.g. the protrusion may tightly fit into the cavity to avoid mechanical play) of the first component 200. The protrusion 320 here comprises a flexible snap element 321 that has a snap protrusion 322 that is snapped into the recess 21 of the first component 200. The snap protrusion 322 may have a ramped front surface for easy insertion of the projection 320 into the cavity 40 (the snap protrusion 322 then glides along an inner surface of the cavity 40 and thereby pushes the flexible snap element 321 into a flexed position). The snap protrusion 322 may have an essentially right-angled backside so that the snap protrusion 322, after it has snapped into the recess 321 cannot be non-destructively removed from the recess 21 so that the first component 200 and the second component 300 are non-detachably coupled to each other. Alternatively, the backside of the snap protrusion 322 may also be ramped (e.g. less strongly ramped than the front side) to allow a non-destructible separation of the first and second components.

Figure 6:
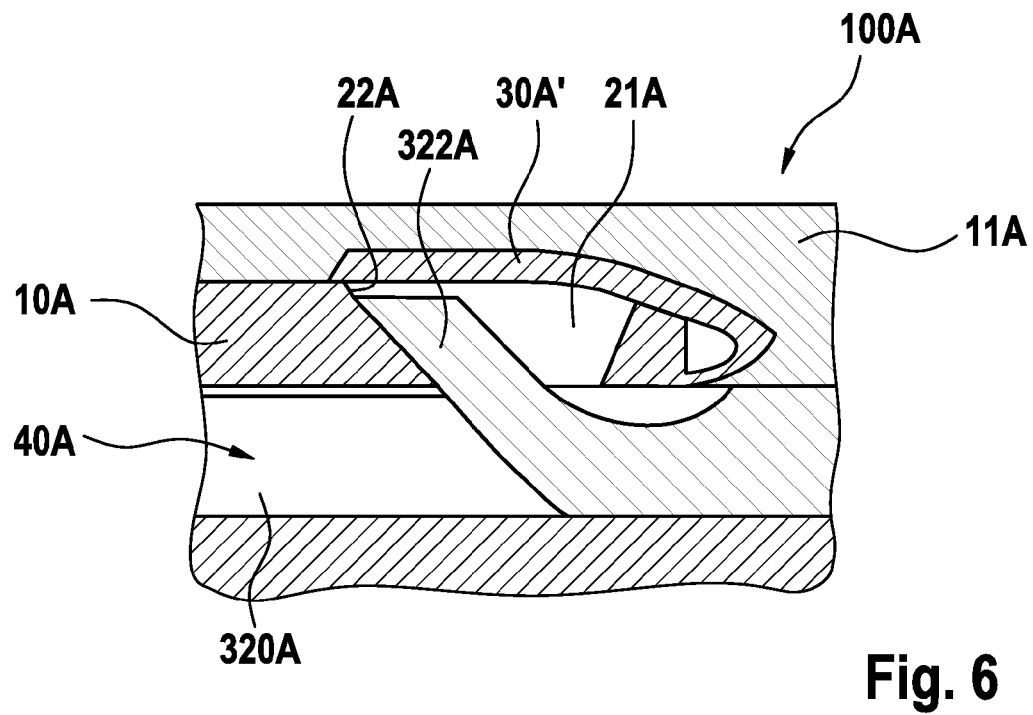
FIG. 6 is a longitudinal cross sectional cut through a portion of an example embodiment of a first component.

FIG. 6 schematically shows a cross sectional cut though the snap area of an example article 100A, where it is shown that a recess 21A has an undercut section 22A at its side oriented towards the free end of a cavity 40A (while in the example embodiments shown in the previous figures, this section had a right-angled structure). In other words, the recess 21A widens from the inner cavity side towards the outer side of a wall of a sheath element 11A.

Figure 7:
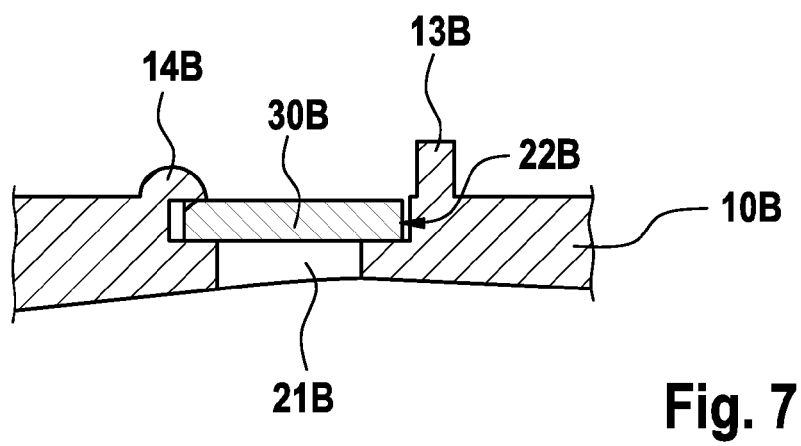
FIG. 7 is a longitudinal cross section through a portion of an example embodiment of a pre-sheath element, in which the closing of a through hole by a lid element is schematically shown.

FIG. 7 is a schematic cross sectional cut through a section of another example pre-sheath element 10B (only partially shown). In this embodiment, a lid element 30B was provided as a separate element, i.e. it was made separate from the pre-sheath element 10B. In the shown example embodiment, the through hole was shaped to have an upper wider section 22B (i.e. the wider section 22B is arranged at the outer side of the sheath element 10B) and a lower smaller section forming a recess 21B after the lid element 30B has been disposed in the upper section 22B. The lid element 22B may be connected to the pre-sheath element 10B by any suitable technique such as laser welding, ultrasonic welding, gluing or by a push-fit or force-fit connection. One further connection possibility is schematically shown in FIG. 7, where at least one projection 13B extends from the outer surface of the pre-sheath element 10B in close vicinity to the upper wide section 22B of the through hole closed by the lid element 30B, which projection may be deformed by a hot stamping process so that the deformed projection 14B clamps the lid element 30B. After this connection of the separate lid element 30B with the pre-sheath element 10B, an additional material will be injection molded over at least a portion of the parting line between the lid element 30B and the pre-sheath element 10B to form a (final) sheath element.

Figure 8:
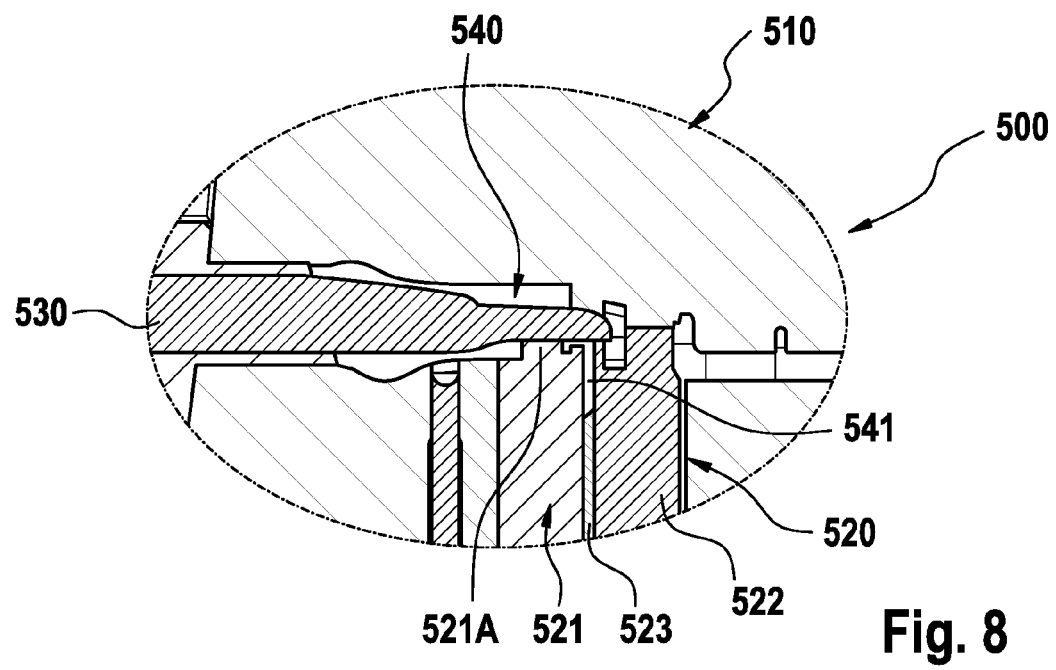
FIG. 8 is a cross sectional cut through a portion of a first mold for making a pre-sheath element as shown in FIG. 1.
Figure 9:
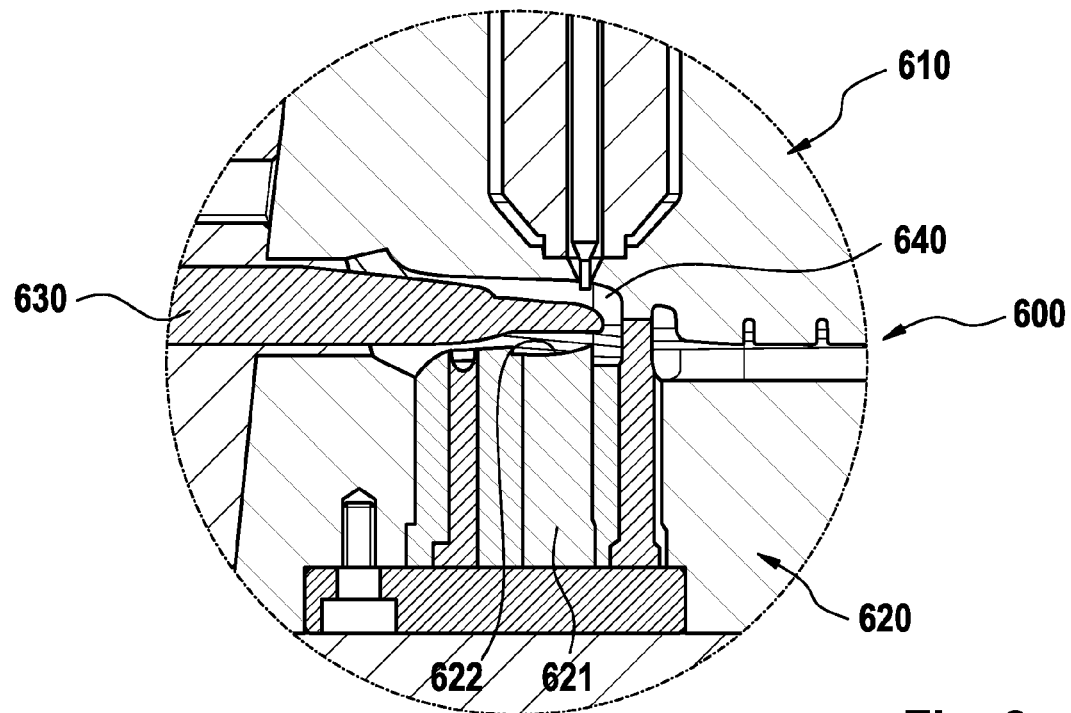
FIG. 9 is a cross sectional cut through a portion of a second mold for making a (final) sheath element as shown in FIG. 3.

FIG. 8 shows a partial cut through an example first mold 500 and FIG. 9 shows a respective partial cut through an example second mold 600 that can be used for making a first component of an article in accordance with the present disclosure.

The first mold 500 (shown it its closed state) comprises three main first mold components, a first injector mold 510, a first ejector mold 520 and a first core element 530. The first mold components 510, 520, and 530 here define a first mold cavity 540 that has the shape of a pre-sheath element 10 together with an integrally formed lid element 30 as partially shown in FIG. 1. Each of the first mold components may comprise at least one sub-component. In the shown embodiment, the first ejector mold 520 comprises a first sub-component 521 that has a projection 521A that tightly abuts with the first core element 530 and thus defines a through hole in the pre-sheath element defined by the first mold cavity 540. The first sub-component 521 together with a second and a third sub-component 522 and 523 border a cavity section 541 of the first mold cavity 540, which cavity section 541 defines a lid element integrally formed together with the pre-sheath element. In some embodiments, where the lid element is provided as a separate element, the first mold cavity of the first mold just defines a pre-sheath element.

FIG. 9 is a partial cut through a second mold (shown in its closed state) having second mold components, namely a second injector mold 610, a second ejector mold 620, and a second core element 630. The second mold components 610, 620 and 630 define a second mold cavity 640. In the shown embodiment, the second ejector mold 620 has a first sub-component being a projection 621 that has a curved contact surface 621A so that the second ejector mold 620 serves as stamping tool to bend a lid element of a sheath element placed on the second core element 630 as was generally described with reference to FIG. 2. Thus, after injecting a first plastic material into the first mold cavity 530, the thus formed pre-sheath element can be transferred to the open second mold and when the second mold is closed, the lid element extending from the pre-sheath element is bend by interaction with the curved contact surface 621 and is in the closed state of the second mold held in its bent state by the projection 621. The remaining portion of the second mold cavity 540 has then at least a cavity section that extends over at least a part of the parting line between the bent lid element and the outer surface of the pre-sheath element. By injecting a second plastic material into the second mold cavity, the remaining second mold cavity 640 is filled and the second plastic material connects the bent lid element with the pre-sheath element as has been previously described, e.g. by establishing a chemical bond with the first plastic material. The second plastic material may be chosen to be the same material as the first plastic material or it may be chosen to be a different material. The second mold is thus used to make the (final) sheath element.

In some embodiments, the first core element of the first mold is arranged so as to be movable such that the injection molded pre-sheath element can stay on the first core element after ejection from the first mold and is transferred from the first mold to the second mold. The second core element is then realized by the first core element.

A third mold having third mold components may be provided for injection molding of a further plastic material for forming further parts of the first component of an article injection molded onto the (final) sheath element.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of manufacturing an injection-molded first component of an article having a sheath element with a cavity and a recess extending from the cavity into a wall of the sheath element surrounding the cavity, the method comprising the steps of:
    providing a first mold having first mold components that define a first mold cavity in the form of a pre-sheath element having a through hole in the pre-sheath element at the location where the recess is to be formed, wherein the first mold components define the lid element as a structure extending from an outer side of the pre-sheath element;
    injection-molding of the pre-sheath element using a first plastic material;
    closing the through-hole with a lid element, wherein the step of closing the through-hole includes bending the lid element until it closes the through hole;
    providing a second mold having second mold components for receiving the pre-sheath element and for defining a remaining second mold cavity that extends at least over a part of a parting line between the lid element and the pre-sheath element when the pre-sheath element is inserted in the second mold;
    inserting the pre-sheath element into the second mold; and
    connecting the lid element with the pre-sheath element by injecting a second plastic material into the second mold cavity such that the sheath element is formed.

2. The method in accordance with claim 1, wherein the step of bending the lid element includes using a stamping tool for bending the lid element into a bent position.

3. The method in accordance with claim 2, wherein the step of bending the lid element includes using a stamping tool for holding the lid element in the bent position.

4. The method in accordance with claim 2, wherein the step of using the stamping tool includes closing the second mold in which the previously injection molded pre-sheath element is disposed, the second mold having a second mold component that has a projection extending into the mold cavity, whereby the projection serves as the stamping tool that bends the lid element when the second mold is closed.

5. The method in accordance with claim 1, wherein at least one of the second mold components is realized by one first mold component.

6. The method in accordance with claim 5, wherein the first mold component comprises a first core element.

7. The method in accordance with claim 1, including providing the first mold such that the first mold components define a living hinge that connects the lid element with the pre-sheath element.

8. The method in accordance with claim 1, wherein the lid element is provided as a separate element not integrally injection-molded with the pre-sheath element.

9. The method in accordance with claim 1, further comprising the step of connecting the lid element with the pre-sheath element prior to an overmolding step.

10. The method in accordance with claim 1, wherein the first mold defines the through hole that widens towards the outer surface of the sheath element.

11. A method of manufacturing an article, comprising the steps of:
providing a first component in accordance with claim 1;
providing a second component having a protrusion suitable for insertion into the cavity of the first component, wherein the protrusion has a flexible snap element having a snap protrusion suitable for snapping into the recess;
connecting the first component and the second component such that the protrusion is inserted into the cavity and the snap protrusion of the flexible snap element snaps into the recess.

12. A method of manufacturing an injection-molded first component of an article having a sheath element with a cavity and a recess extending from the cavity into a wall of the sheath element surrounding the cavity, the method comprising the steps of:
providing a first mold having first mold components that define a first mold cavity in the form of a pre-sheath element having a through hole in the pre-sheath element at the location where the recess is to be formed, wherein the first mold components define a living hinge that connects the lid element with the pre-sheath element;
injection-molding of the pre-sheath element using a first plastic material;
closing the through-hole with a lid element;
providing a second mold having second mold components for receiving the pre-sheath element and for defining a remaining second mold cavity that extends at least over a part of a parting line between the lid element and the pre-sheath element when the pre-sheath element is inserted in the second mold;
inserting the pre-sheath element into the second mold; and
connecting the lid element with the pre-sheath element by injecting a second plastic material into the second mold cavity such that the sheath element is formed.

13. The method of claim 12, wherein the step of closing the through-hole includes bending the lid element until it closes the through hole.

* * * * *